United States Patent
Schmidt et al.

(10) Patent No.: US 10,626,196 B2
(45) Date of Patent: Apr. 21, 2020

(54) AQUEOUS COAGULATABLE POLYMER DISPERSION AND USE THEREOF AS AN ADHESIVE

(71) Applicant: Jowat SE, Detmold (DE)

(72) Inventors: Christian Schmidt, Detmold (DE); Christian Terfloth, Detmold (DE)

(73) Assignee: Jowat SE, Detmold (DE)

( * ) Notice: Subject to any disclaimer, the term of this patent is extended or adjusted under 35 U.S.C. 154(b) by 0 days.

(21) Appl. No.: 15/513,685

(22) PCT Filed: Sep. 30, 2015

(86) PCT No.: PCT/EP2015/072546
§ 371 (c)(1),
(2) Date: Mar. 23, 2017

(87) PCT Pub. No.: WO2016/050838
PCT Pub. Date: Apr. 7, 2016

(65) Prior Publication Data
US 2017/0291965 A1    Oct. 12, 2017

(30) Foreign Application Priority Data

Oct. 1, 2014  (EP) ..................................... 14187381

(51) Int. Cl.
| | | |
|---|---|---|
| C08F 6/22 | (2006.01) | |
| C08J 9/36 | (2006.01) | |
| C08J 9/32 | (2006.01) | |
| C08K 9/10 | (2006.01) | |
| C09J 11/00 | (2006.01) | |
| C09D 11/106 | (2014.01) | |
| C09J 7/38 | (2018.01) | |

(52) U.S. Cl.
CPC ....... *C08F 6/22* (2013.01); *C08J 9/32* (2013.01); *C08J 9/365* (2013.01); *C08K 9/10* (2013.01); *C09D 11/106* (2013.01); *C09J 7/38* (2018.01); *C09J 11/00* (2013.01); *C08J 2201/026* (2013.01); *C08J 2323/02* (2013.01); *C08J 2325/04* (2013.01); *C08J 2333/06* (2013.01); *C08J 2375/04* (2013.01); *C09J 2205/102* (2013.01); *C09J 2205/11* (2013.01)

(58) Field of Classification Search
None
See application file for complete search history.

(56) References Cited

U.S. PATENT DOCUMENTS

| 6,740,373 B1 | 5/2004 | Swoboda et al. |
|---|---|---|
| 9,321,934 B2 | 4/2016 | Mogele et al. |
| 2008/0017338 A1* | 1/2008 | Nordin ..................... B01J 13/14 162/103 |
| 2014/0141185 A1 | 5/2014 | Huang et al. |
| 2017/0030010 A1* | 2/2017 | Baumann ............ D06M 15/263 |

FOREIGN PATENT DOCUMENTS

| DE | 102010056346 A1 | 7/2012 | |
|---|---|---|---|
| WO | 2004113613 A1 | 12/2004 | |
| WO | 2007142593 A1 | 12/2007 | |
| WO | WO-2009059366 A1 * | 5/2009 | ........... D06N 7/0081 |
| WO | 2011072237 A1 | 6/2011 | |

OTHER PUBLICATIONS

Mowilith DM-107 MSDS, retrieved Jul. 18, 2018. (Year: 2018).*
Acronal S 504 technical brochure, downloaded Dec. 9, 2018. (Year: 2018).*
Silverson High Shear Mixers technical brochure, downloaded Dec. 9, 2018. (Year: 2018).*
Pacek et al. Characterization of Flow Patterns in a Rotor Stator High Shear Mixer, Proceedings of European Congress of Chemical Engineering, Sep. 16-20, 2007. (Year: 2007).*

* cited by examiner

*Primary Examiner* — Christopher M Rodd
(74) *Attorney, Agent, or Firm* — The Webb Law Firm

(57) ABSTRACT

The invention relates to an aqueous coagulatable polymer dispersion comprising at least one polymer which is dispersed in an aqueous phase, thermoplastic micro-spheres which contain a propellant, and at least one additional component which is selected from the group consisting of polyols, polyamines, and thermoplastic polymers. The invention further relates to a coagulate which can be obtained by the thermal and/or mechanical and/or ultrasonically-initiated coagulation of the aqueous polymer dispersion according to the invention, to an adhesive comprising or consisting of the coagulate, to a substrate which is completely or partly coated with said coagulate, to a method for producing such a coated substrate, and to coated substrates which can be obtained using said method. The coagulate can be used as an adhesive or as a binder in 3D-printing methods.

14 Claims, No Drawings

AQUEOUS COAGULATABLE POLYMER DISPERSION AND USE THEREOF AS AN ADHESIVE

CROSS-REFERENCE TO RELATED APPLICATIONS

This application is the United States national phase of International Application No. PCT/EP2015/072546 filed Sep. 30, 2015, and claims priority to European Patent Application No. 14187381.0 filed Oct. 1, 2014, the disclosures of which are hereby incorporated in their entirety by reference.

BACKGROUND OF THE INVENTION

Field of the Invention

The invention relates to an aqueous coagulatable polymer dispersion comprising at least one polymer dispersed in an aqueous phase, thermoplastic microspheres containing a blowing agent (propellant), and at least one additional component selected from the group consisting of polyols, polyamines and thermoplastic polymers.

Further, the invention relates to a coagulate obtainable by thermal and/or mechanical and/or ultrasound-initiated coagulation of the aqueous polymer dispersion according to the invention, an adhesive or binder comprising or consisting of the coagulate, a substrate entirely or partially coated with the coagulate, a process for producing such a coated substrate, and coated substrates obtainable by such a process. The coagulate may be used as an adhesive or as a binder in 3D-printing procedures.

Description of Related Art

Folding cardboard containers and boxes as well as paper bags and bags made from sheet composites are versatile packaging types employed in all fields of product transport or product presentation. The bonding/adhesion steps necessary for preparing the packaging use different systems (dispersion and hotmelt adhesives) having different advantages and disadvantages and take place at different places of the supply chain.

For example, the manufacturer of packaging materials produces the corrugated board (testliner, kraftliner) from paper and cardboard grades. From this raw material, the packaging blank is prepared by printing, laminating, painting and punching processes. While for tray applications (tray construction) the work of the manufacturer is complete at this stage, folding and telescope boxes require further that a preliminary bonding of the longitudinal seam be additionally effected. In the majority of cases, this is achieved through the use of dispersion adhesives. The produced packagings are delivered to the packer who then places the goods to be transported (i.e., to be marketed) into the packaging and seals the packaging subsequently through use of an adhesive bond.

In order to ensure high throughput numbers and high productivity, hotmelt adhesives based on ethylene-vinyl acetate (EVA) and polyolefins (PO) are mostly employed for sealing cardboard cartons and folding boxes. Since adhesives based on these raw material have setting times of from less than one second up to three seconds, they are ideally suited to quickly stem the restoring forces of the packaging that occur after the initial pressing. A dispersion adhesive is usually incapable of achieving this. The quality of the adhesives increases from EVA to PO.

While commodity products based on EVA have a lower stability in the melt, lower adhesion properties with respect to different surfaces, a tendency to smell offensive and low transparency, products based on POs mostly do not exhibit these drawbacks. Products based on POs are, however, more expensive.

Disadvantages found in each of the abovementioned systems include, for example, lower heat resistance (max. 70° C.) in comparison to dispersions, a weakening of the bond caused by migrating components from the packaged goods (tea packagings), or lower mechanical strength (blow filling). Thus, so-called combination bonding in which a hotmelt adhesive is applied together with a dispersion is preferred in the field of packaging bags. The hotmelt adhesive provides an initial cohesion of the packaging in the manufacturing process, while the long-term stability and durability is effected by the dispersion.

The use of hotmelt adhesives in the packaging industry also involves drawbacks in terms of processing. Thus, the hotmelt adhesive must be melted before use and maintained at a processing temperature over the time of use. The hose lines and nozzle-application system are also heated. This results in substantial energy consumption. Although this energy consumption has already been reduced through developments of the application device manufacturers (Nordson Freedom® and Liberty® System), there is still potential for improvement, as, for example, a material with a high tendency to blocking cannot be promoted by such systems.

One approach to solving this problem is described in WO 2011/072237. Therein, a thermally activatable adhesive composition of the plastisol type is described, which contains particles of a first polymer and particles of a second polymer dispersed in a liquid organic carrier medium (e.g., vegetable oils, epoxidized vegetable oils, bio-diesel, glycerol). When a particular activation temperature is reached, the particles of the second polymer either dissolve or plasticize in the carrier medium.

The production of hardcover books remains, despite competition from electronic media, an important market with high demands on the finished product.

In book production, a distinction is made between softcover and hardcover books. Depending on the type of the respective product, different bonding steps are necessary for the production. One of the most important steps is adhesive binding, i.e., the connection of the individual sheets of the book with each other to form the so-called body of the book and, in the case of a softcover book, also with the cover. In terms of bonding technology, this process step is, depending on the kind of machine used, effected by means of dispersion adhesives, conventional thermoplastic hotmelt adhesives based on EVA or PO, and increasingly commonly with reactive polyurethane (PUR) hotmelt adhesives. Each of these systems has both advantages and disadvantages. In dispersion adhesives, the good penetration into the sheet edge (fiber) and the accompanying strength as well as the lay-flat behavior are valued. However, the slow production speed is criticized by many bookbinders. This can be increased, for example, by using hotmelt adhesives. However, lower strength and worse lay-flat behavior must often be accepted instead.

In this application case, an adhesive system is desirable that combines the advantages of the individual adhesive systems without exhibiting their drawbacks. Filter media, for example, those for the automobile or interior fields, have the important function of protecting high-performance aggregates, such as engines or electronic components, from contamination caused by soot, dust or other pollutants. Filter materials made from treated and untreated grades of paper and various non-wovens or nanofibers are employed in this regard. In the industrial fabrication of the filter media, adhesives are employed for a variety of purposes. In addition to the bonding of adsorbants such as active charcoal, the adhesive primarily serves the constructive and shape-providing bonding of the filter. In this regard, two fabrication steps are of particular importance. In the so-called pleating method, the two-dimensional filter material is folded and the individual folds bonded together at an exact pre-defined distance. The object of pleating is to maximize the filter surface within the available space. During the fabrication, an adhesive strip is thus placed on the filter composite before the folding. In the subsequent folding, adhesive strips come to rest on top of one another, thus ensuring a consistent distance. In addition, another adhesive strip is applied to the folded parts, which provides for additional strength. As a last step of fabrication, the pleated material is embedded in a frame. The latter provides for shape stability and strength even under the highest stress.

Today, thermoplastic hotmelt adhesives based on EVA and PO are predominantly employed as the adhesive system. The demands on these systems in view of loadability are very high. Aside from an open time appropriate for the processing process (for example, in order to enable pleating), the setting must occur very quickly. In addition, finished filter materials are in some cases subjected to a high temperature treatment after the adhesive bonding, which the bond must of course resist. Especially in view of this stress, the use of dispersion adhesives with a high heat resistance would be advantageous. In addition, the dispersion achieves a better penetration into the filter medium, which additionally increases the mechanical strength. This would be an additional advantage for frame bonding. Since dispersion systems have significantly slower setting speeds in comparison to hotmelt adhesives, the use of dispersions results in a deterioration of productivity. Therefore, it would again be desirable in this case to have an adhesive system available that combines the advantages of the individual adhesive types without having their respective drawbacks.

From the point of view of users of adhesives, the use of dispersion and hotmelt systems are associated with the abovementioned advantages and disadvantages in the described exemplary applications. Therefore, it was the object of the invention to develop a composition and a process that make use of the respective advantages of the individual systems in respect of transport, processing and final strength but without exhibiting the respective disadvantages.

Therefore, it is desirable to provide an aqueous polymer dispersion that can be formulated, filled and transported like a dispersion adhesive, but can be triggered in an application device (for example, by temperature, shear, ultrasound or pressure) to behave with regards to its properties (setting speed, strength build) like a hotmelt adhesive and which, after application, additionally retains the properties of a dispersion (heat resistance, flexibility, resistance to migrating substances).

The production method of so-called 3D-printing is increasingly gaining importance as a key technology. The advantages of this technology include a high freedom of object design and short times from idea conception to marketing. By way of example, one of the main applications of this technology is therefore in the field of "rapid prototyping". Markets into which this production technology has already entered include, for example, the automobile, aviation and health industries. Furthermore, 3D-printers increasing making inroads into the home-user market in respect of the fabrication of replacement parts or self-designed, "ready-to-use out of the 3D-printer" objects.

In principle, the production of the 3D-printed object from plastic materials can be effected in several ways (3Druck-.com). These include, for example:
1.) Additive Layer Manufacturing
   This form of manufacturing requires a powdery solid as a base material and a binder or fixing agent. Through a printing head similar to that of an ink-jet printer, the liquid binder is applied with pinpoint accuracy to the powder layer then cured. This is followed by an additional application of the powder to the bound first layer and a further fixation. In this way, a 3D-object is formed layer-by-layer from individual 2D-layers, which are bonded to one another.
2.) Fused Filament Fabrication
   This manufacturing method makes use of meltable plastics as base materials. Using a printing head (extruder) similar to that of a hotmelt application device, the pre-melted polymer is applied to a heatable platform layer by layer. This can be done on the one hand by moving the printing head, or the platform. After the previous layer has cooled and hardened, the application of the next layer can be effected.
3.) Liquid Materials (e.g., Stereolithography)
   The production is based on a tank filled with a liquid medium. The surface of the liquid is cured and hardened layer-by-layer by introduced UV radiation, a laser, an electron beam or the like. Then, the object is lowered, so that new liquid is constantly available for construction at the surface. Because of the possibility of pinpoint laser control, this method is one of the most precise, but also one of the most expensive.

Different raw materials are used in 3D-printing depending on the method employed. Thus, for example, two-component binders based on diamines and dicarbonyl compounds are employed for the fixing of powders (e.g., PMMA or PA) in additive layer manufacturing (DE 10 2010 056 346 A1). After mixing, they react to form Schiff bases.

In fused filament fabrication technology, thermoplastic materials such as PLA, PA or polycarbonates are used. They are often obtainable in the form of a wound coil, which is directly inserted into the device.

In the case of stereolithography, reactive monomers that are linked together by the selected energy source (activation) are employed.

With respect to the binders employed, each of these methods exhibits both advantages and disadvantages. In the case of the two-part mixture in the field of additive layer manufacturing, the requirement of the precise mixing of the two components on the powder material may be mentioned as a possible disadvantage. In the field of fused filament fabrication, the polymers employed must first be melted at high temperatures. In addition, the selection of possible polymers is (still) very limited. Although the storage in the form of a coil offers ready accessibility, this is at the expense of a higher space requirement. In stereolithography, the reactive mixture must be well protected or stabilized in order to prevent a possible premature reaction.

Therefore, it is further desirable to provide an alternative binder that extends the range of employable polymers and minimizes drawbacks as far as possible, which can be formulated, transported and stored as an aqueous binder, thus having many of the handling advantages of a dispersion, but behaving like a meltable binder upon the action of a trigger in an application device (for example, temperature, shear, ultrasound or pressure), and which has the properties of a conventional binder after application (heat resistance, resistance to various substances, flexibility, mechanical strength and the like).

SUMMARY OF THE INVENTION

The invention relates to:
1. an aqueous polymer dispersion, comprising
(i) at least one polymer dispersed in an aqueous phase and selected from the group consisting of polyurethane, vinyl acetate/ethylene copolymers, poly(vinyl acetate) (PVAc), polyacrylate, poly(styrene/acrylate), styrene/butadiene (block) copolymer, styrene/isoprene (block) copolymer, polyisoprene copolymer, polychloroprene, polyolefin homopolymers and copolymers of $C_2$-$C_8$ alkenes, polyepoxide and polylactic acid,
(ii) thermoplastic microspheres containing a blowing agent, and
(iii) at least one additional component selected from the group consisting of polyols, polyamines and thermoplastic polymers.
2. The aqueous polymer dispersion according to item 1, characterized in that said polyol is selected from the group consisting of (poly)propylene glycol, (poly)ethylene glycol, glycerol and starch, and said polyamine is urea. The thermoplastic polymers are selected from the group consisting of ethylene/vinyl acetate, polyamide, polyester, polyethylene, polypropylene, polystyrene, styrene-containing copolymers and ethylene/propylene copolymers. Ethylene/vinyl acetate (EVA) is preferred as said additional component. The ethylene/vinyl acetate can have a proportion of vinyl acetate of up to 28% by weight, preferably at least 14% by weight.
3. The aqueous polymer dispersion according to one or more of the preceding items, characterized in that it is caused to coagulate by an input of energy.
4. The aqueous polymer dispersion according to one or more of the preceding items, characterized in that said input of energy for coagulation is effected thermally and/or mechanically and/or by ultrasound. One example of mechanical energy input into a material system is shear.
5. The aqueous polymer dispersion according to one or more of the preceding items, characterized in that said dispersed polymer has 40% by weight or more $C_1$-$C_{20}$ alkyl (meth)acrylates, preferably $C_1$-$C_8$ alkyl (meth)acrylates, more preferably $C_1$-$C_4$ alkyl (meth)acrylates.
6. The aqueous polymer dispersion according to one or more of the preceding items, characterized in that said dispersed polymer has a glass-transition temperature of 35° C. or less, or 0° C. or less.
7. The aqueous polymer dispersion according to one or more of the preceding items, characterized in that said aqueous polymer dispersion is an adhesive.
8. The aqueous polymer dispersion according to one or more of the preceding items, characterized in that said aqueous polymer dispersion contains at least one tackifier in an amount of 40% by weight or less, or 1% by weight or more to 35% by weight or less.
9. The aqueous polymer dispersion according to one or more of the preceding items, characterized in that the content of dispersed polymer in the polymer dispersion is 20% by weight or more to 75% by weight or less, the content of said microspheres in the polymer dispersion is 0.1% by weight or more to 20% by weight or less, and the total solids content of said aqueous polymer dispersion is preferably 30% by weight or more to 80% by weight or less.
10. The aqueous polymer dispersion according to one or more of the preceding items, characterized in that the content of additional component in the polymer dispersion is from 1% by weight or more to 15% by weight or less, from 1% by weight or more to 8% by weight or less, or from 2% by weight or more to 5% by weight or less.
11. The aqueous polymer dispersion according to one or more of the preceding items, characterized in that said microspheres have a shell of thermoplastic polymer and a blowing agent enclosed therein, said blowing agent preferably consisting of one or more hydrocarbons having one carbon or more to eight carbons or less in the chain, wherein said microspheres have a volume median particle size D(0.5) of 5 µm or more to 40 µm or less in a non-expanded state.
12. The aqueous polymer dispersion according to one or more of the preceding items, characterized in that said at least one $C_1$ to $C_8$ hydrocarbon is selected from the group consisting of methane, ethane, n-butane, isobutane, pentane or its structural isomers, hexane or its structural isomers, heptane or its structural isomers, and octane or its structural isomers, or fluorinated and/or chlorinated derivatives thereof.
13. The aqueous polymer dispersion according to one or more of the preceding items, characterized in that said shell of said microspheres is formed from a copolymer of ethylenically unsaturated monomers comprising at least one monomer selected from (meth)acrylate ester monomers, vinylidene halide monomers, acrylonitrile and vinyl ether monomers.
14. The aqueous polymer dispersion according to one or more of the preceding items, characterized in that said shell of said microspheres is formed from a copolymer of monomers comprising alkyl (meth)acrylate (e.g., methyl, ethyl, propyl or butyl (meth)acrylate), vinylidene chloride and acrylonitrile, or of monomers comprising at least one vinyl ether monomer and acrylonitrile.
15. The aqueous polymer dispersion according to one or more of the preceding items, characterized in that said microspheres have an expansion starting temperature ($T_{start}$) of 40° C. or more to 140° C. or less, and a temperature of maximum expansion ($T_{max}$) that is higher than $T_{start}$ and is within a range of from 80° C. or more to 200° C. or less.
16. The aqueous polymer dispersion according to one or more of the preceding items, characterized in that said coagulation is effected thermally by heating at a temperature of 50° C. or more to 150° C. or less, preferably 60° C. or more to 110° C. or less, and/or that the coagulation is effected by shearing with shear rates of 100 $s^{-1}$ or more to 500000 $s^{-1}$ or less.
17. A coagulate obtainable by the thermal and/or mechanical and/or ultrasound-initiated coagulation of the aqueous polymer dispersion as defined in any one or more of items 1 to 16.
18. The coagulate according to item 17, characterized in that said coagulation is effected thermally by heating at a temperature of 50° C. or more to 150° C. or less, preferably 60° C. or more to 110° C. or less, and/or that the coagulation is effected mechanically by shearing with shear rates of 100 $s^{-1}$ or more to 500000 $s^{-1}$ or less.
19. An adhesive or binder comprising or consisting of the coagulate according to any one or more of items 17 or 18. In a preferred embodiment, the adhesive is identical with the coagulate.
20. A substrate entirely or partially coated with the coagulate according to item 17 or 18 or with an adhesive according to item 19.
21. The coated substrate according to item 20, characterized in that said substrate is selected from the group consisting of paper, paperboard, cardboard, wood, stone, concrete, non-woven fabric of artificial and/or natural fibers, woven textiles of artificial and/or natural fibers, open-pore or closed-pore polymer foams, especially consisting of polyurethane, polyester, polyethylene, polypropylene and polystyrene, or composites of the abovementioned substrates.

22. The coated substrate according to item 20 or 21, characterized in that said substrate is entirely or partially provided with a plastic coating (a plastic film) on the side opposite the adhesive coating.

23. A 3D-printed article or object (i.e., a three-dimensional workpiece) comprising the binder according to item 19.

24. A process for preparing a coated substrate as defined in any one or more of items 20 to 22, characterized in that the coagulate as defined in any one or more of items 17 or 18 or the adhesive as defined in item 19 is entirely or partially coated onto the surface of at least one substrate.

25. The process according to item 24, characterized in that said substrate is a cardboard material.

26. The process according to item 25, characterized in that said cardboard material is a packaging, and said coagulate/adhesive is applied to a sealable region of the cardboard material, and said packaging made of the cardboard material is sealed by means of the applied coagulate/adhesive.

27. Coated substrates obtainable by a process according to one or more of items 24 to 26.

28. Use of the coagulate according to item 17 as an adhesive for the bonding of substrates, or as a binder in 3D-printing methods.

The aqueous dispersion according to the invention can be prepared by mixing together (i) said at least one polymer dispersed in an aqueous phase, (ii) said thermoplastic microspheres containing the blowing agent, and (iii) said at least one additional component selected from the group consisting of polyols, polyamines and thermoplastic polymers, to form an aqueous polymer dispersion.

The coagulate according to the invention can be prepared from the aqueous polymer dispersion according to the invention by causing said aqueous polymer dispersion as described above to coagulate through an energy input. The coagulated mass may subsequently be separated from the water, for example, by discharging the coagulate through a discharge opening, preferably in the form of a nozzle or capillary. The coagulate, which may still contain the water of the dispersion in a finely divided form in its interior, may be used as an adhesive, for example, in the form of an adhesive strip. Any residual water contained in the coagulate is released to the substrate and/or to the environment. The coagulate may further be used as a binder for materials (e.g., plastics, synthetic resins, ceramics or metals) in 3D-printing for preparing three-dimensional workpieces.

DETAILED DESCRIPTION

The invention relates to an aqueous polymer dispersion, comprising
(i) at least one polymer dispersed in an aqueous phase as described above,
(ii) thermoplastic microspheres containing at least one blowing agent, and
(iii) at least one component selected from the group consisting of polyols, polyamines and thermoplastic polymers.

Polymer Dispersed in an Aqueous Phase

The content of polymer in the aqueous dispersion is preferably from 20% by weight or more to 75% by weight or less, or to 70% by weight or less, in particular from 50% by weight or more to 65% by weight or less.

The term "aqueous phase" as used herein means a phase that consists of at least 50% by weight of water, based on the total weight of the phase. Preferably, it consists of at least 70% by weight, more preferably at least 80% by weight, even more preferably at least 90% by weight, especially at least 99% by weight, of water, based on the total weight of the phase. In a preferred embodiment, the phase consists exclusively of water.

Suitable polymers of the dispersed polymer are selected from the group consisting of polyurethane, vinyl acetate/ethylene copolymers, poly(vinyl acetate) (PVAc), poly-acrylate, poly(styrene/acrylate), styrene/butadiene (block) copolymer, styrene/isoprene (block) copolymer, polyisoprene copolymer, polychloroprene, polyolefin homopolymers and copolymers of $C_2$-$C_8$ alkenes, polyepoxide and polylactic acid.

In particular, the polymer dispersed in the aqueous dispersion is obtainable by the polymerization of free-radically-polymerizable compounds (monomers), or it is a polymer obtainable by polycondensation, such as polyurethanes. Preferably, the aqueous polymer dispersion is prepared by emulsion polymerization. Therefore, the polymer dispersed in said aqueous dispersion is preferably a product of emulsion polymerization.

In the following, the term "(meth)acryl" and similar terms constitute an abbreviation for "acryl or methacryl".

Preferably, the polymer consists of at least 40% by weight, more preferably at least 60% by weight, even more preferably at least 80% by weight, of so-called main monomers. The main monomers are selected from $C_1$-$C_{20}$ alkyl (meth)acrylates (e.g., from vinyl esters of carboxylic acids containing up to 20 carbon atoms, vinyl aromatics with up to 20 carbon atoms, ethylenically unsaturated nitriles, vinyl halides, vinyl ethers of alcohols containing from 1 to 10 carbon atoms, aliphatic hydrocarbons with 2 to 8 carbon atoms and 1 or 2 double bonds, or mixtures of these monomers. Preferably, the dispersed polymer consists of more than 40% by weight of $C_1$-$C_{20}$ alkyl (meth)acrylates.

These may be, for example, (meth)acrylic acid alkyl esters with a $C_1$-$C_{10}$ alkyl group, such as methyl methacrylate, methyl acrylate, n-butyl acrylate, ethyl acrylate, and 2-ethylhexyl acrylate. In particular, mixtures of the (meth) acrylic acid alkyl esters are also suitable. Vinyl esters of carboxylic acids with 1 to 20 carbon atoms include, for example, vinyl laurate, vinyl stearate, vinyl propionate, versatic acid vinyl ester, and vinyl acetate. As vinyl-aromatic compounds, vinyltoluene, alpha- and para-methylstyrene, alpha-butylstyrene, 4-n-butylstyrene, 4-n-decylstyrene and preferably styrene may be considered. Examples of nitriles include acrylonitrile and methacrylonitrile. The vinyl halides are ethylenically unsaturated compounds substituted with chloro, fluoro or bromo, preferably vinyl chloride and vinylidene chloride. Vinyl ethers may be, for example, vinyl methyl ether or vinyl isobutyl ether. Vinyl ethers of alcohols containing from 1 to 4 carbon atoms are preferred. Examples of said hydrocarbons with 2 to 8 carbon atoms and one or two olefinic double bonds include butadiene, isoprene and chloroprene, ethylene or propylene. Polymers or (block) copolymers obtained from butadiene or isoprene may also be subsequently hydrogenated.

Preferred main monomers include vinyl esters, preferably vinyl acetate, in particular also in combination with ethylene (abbrev. vinyl acetate/ethylene copolymers), butadiene, isoprene, especially also in combination with styrene (abbrev. butadiene/styrene (block) copolymers or isoprene/styrene (block) copolymers), and $C_1$-$C_{10}$ alkyl (meth)acrylates, especially $C_1$-$C_8$ alkyl (meth)acrylates (abbrev. polyacrylates), polyacrylates being particularly preferred respectively.

The butadiene/styrene (block) copolymers or isoprene/styrene (block) copolymers may be grafted with maleic anhydride and/or subsequently hydrogenated or partially hydrogenated as mentioned above. Typical representatives include the styrene/butadiene or styrene/isoprene rubber (SBR and SIS) block copolymers, and the styrene/butadiene/styrene (SBS) or styrene/isoprene/styrene (SIS) rubber (tri) block copolymers, or styrene/ethylene/butylene/styrene (SEBS) rubber or styrene/isoprene/styrene (SIS) rubber, styrene/isobutylene/styrene (SIBS) rubber, or styrene/ethylene/propylene/styrene (SEPS) rubber.

Even more preferred main monomers include $C_1$-$C_{10}$ alkyl (meth)acrylates; in particular, methyl acrylate, ethyl acrylate, n-butyl acrylate, n-hexyl acrylate, octyl acrylate and 2-ethylhexyl acrylate, as well as mixtures of these monomers. The product of emulsion polymerization preferably consists of more than 40% by weight, especially more than 60% by weight, more preferably more than 80% by weight, of $C_1$-$C_{20}$ alkyl (meth)acrylates.

In addition to the main monomers, the polymer may contain other monomers, for example, monomers with carboxylic acid, sulfonic acid or phosphonic acid groups. Carboxylic acid groups are preferred. Examples thereof include acrylic acid, methacrylic acid, itaconic acid, maleic acid or fumaric acid. Further monomers include, for example, monomers containing hydroxy groups, especially $C_1$-$C_{10}$ hydroxyalkyl (meth)acrylates, monomers containing (meth)acrylamide and ureido groups, such as ureido (meth)acrylates. In addition, phenyloxyethylglycol mono(meth)acrylate, glycidyl acrylate, glycidyl methacrylate, amino (meth)acrylates, such as 2-aminoethyl (meth)acrylate, may be mentioned as further monomers. Monomers that contain other functional groups such as, for example, isocyanate, amino, hydroxy, amide or glycidyl groups in addition to the double bond may improve, for example, adhesion to substrates. In particular, cyclic lactams, such as N-vinylpyrrolidone or N-vinylcaprolactam, may also be considered.

Another group of polymers dispersed in the aqueous polymer dispersion according to the invention are polyurethanes, especially polyurethanes that are adhesive at room temperature (20° C.). Preferably, a polyurethane that is predominantly formed from polyisocyanates, especially diisocyanates, and, as the reaction partner, polyesterdiols, polyetherdiols or mixtures thereof may be considered. Preferably, the polyurethane is constituted of at least 40% by weight, more preferably at least 60% by weight and even more preferably at least 80% by weight of diisocyanates, polyetherdiols and/or polyesterdiols. Preferably, the polyurethane contains polyesterdiols in an amount of more than 10% by weight, more preferably more than 30% by weight, especially more than 40% by weight, or more than 50% by weight, even more preferably more than 60% by weight, based on the polyurethane. In particular, polyesterdiols are used as building components. If polyesterdiols are used in admixture with polyetherdiols, preferably at least 50 mole %, more preferably at least 80 mole %, even more preferably 100 mole %, of the mixture of polyester- and polyetherdiols are polyesterdiols.

The polyurethane is preferably constituted of:
(a) diisocyanates,
(b) diols, of which
   b1) from 10 to 100 mol %, based on the total amount of diols (b), has a molecular weight of 500 to 5000 g/mol,
   b2) from 0 to 90 mol %, based on the total amount of diols (b), has a molecular weight of 60 to 500 g/mol,
(c) monomers other than monomers (a) and (b), with at least one isocyanate group or at least one isocyanate-reactive group, which additionally contain at least one hydrophilic group or a potentially hydrophilic group, through which the water-dispersibility of the polyurethanes is effected,
(d) optionally, further polyvalent compounds other than monomers (a) to (c), with reactive groups that are alcoholic hydroxy groups, primary or secondary amino groups, or isocyanate groups, and
(e) optionally, monovalent compounds other than monomers (a) to (d), with a reactive group that is an alcoholic hydroxy group, a primary or secondary amino group, or an isocyanate group.

The aqueous polymer dispersion or the aqueous binder is preferably an adhesive, more preferably a pressure-sensitive adhesive. The term "pressure-sensitive adhesive" as used herein means an adhesive that is permanently adhesive at room temperature (20° C.). The characteristic of a pressure-sensitive adhesive is sufficient adhesion (stickiness) associated with a necessary cohesion (inner strength in the adhesive layer).

Another group of polymers dispersed in the aqueous polymer dispersion according to the invention are polyolefins from $C_2$-$C_8$, $C_2$-$C_6$ or $C_2$-$C_4$ mono-unsaturated olefins (alkenes). Ethene (ethylene), 1- or 2-propene (propylene) and butene (1-butene, 2-butene, isobutylene) may be mentioned as examples.

Another group of polymers dispersed in the aqueous polymer dispersion according to the invention are polyepoxides (epoxy resins). These are glycidyl-based epoxy resins (glycidyl ethers) obtainable by reacting epichlorohydrin with aliphatic and aromatic dialcohols. Suitable diols include bisphenol A and 1,6-hexanediol.

Another group of polymers dispersed in the aqueous polymer dispersion according to the invention are poly (lactic acids) (polylactides) and copolymers of HEMA and HEA lactates (reaction products of polylactic acids with hydroxyethyl methacrylate or hydroxyethyl acrylate) with (meth)acrylic acid or its $C_1$-$C_8$ alkyl esters, such as methyl (meth)acrylate, ethyl (meth)acrylate, propyl (meth)acrylate, or 2-ethylhexyl (meth)acrylate.

The glass-transition temperature (Tg) of the polymer is generally less than or equal to +15° C. in adhesives, generally preferably less than or equal to 0° C. in pressure-sensitive adhesives. Preferably, the Tg is from −65° C. to +10° C., more preferably from −65° C. to less than or equal to 0° C., even more preferably from −65° C. to −10° C., or from −65° C. to −20° C. The glass-transition temperature can be determined by differential scanning calorimetry (DSC; ASTM D 3418-08, so-called "midpoint temperature").

Thermoplastic Microspheres Containing Blowing Agents

The aqueous polymer dispersion further contains thermoplastic microspheres containing one or more blowing agents. These microspheres, which comprise a thermoplastic polymer shell and a blowing agent enclosed therein, are commercially available, for example, under the trademark EXPANCEL®.

In such microspheres, the blowing agent is usually a liquid with a boiling point not higher than the softening temperature of the thermoplastic polymer shell. The softening temperature of the polymer shell, normally corresponding to its glass-transition temperature Tg, is preferably within a range of from 0 to 140° C., most preferably from 30 to 100° C. Upon heating, the blowing agent evaporates, thus increasing the interior pressure, while the shell softens at the same time, which results in a considerable enlargement of the microspheres. The temperature at which the expansion starts is called $T_{start}$, while the temperature at which the maximum expansion is reached is referred to as $T_{max}$. $T_{start}$ for the microspheres is preferably from 40 to 140° C., most preferably from 50 to 100° C. $T_{max}$ of the microspheres is higher than $T_{start}$ and preferably from 80 to 200° C., most preferably from 100 to 170° C.

Such microspheres are obtainable in a wide variety of forms, for example, as dry free-flowing particles, as an aqueous slurry, or as partially dehydrated wet cakes. Microspheres can be prepared by polymerizing ethylenically unsaturated monomers in the presence of a blowing agent. Detailed descriptions of various suitable microspheres and the preparation thereof is found, for example, in WO 2004/113613, WO 2007/142593, and the references cited therein.

The content of microspheres in the aqueous dispersion is preferably from 0.1 to 20% by weight, especially from 0.5 to 10% by weight.

The content of blowing agent enclosed in the microspheres is preferably from 5 to 50% by weight, or from 10 to 50% by weight, from 15 to 40% by weight, and more preferably from 20 to 35% by weight, based on the mass of the microspheres. The blowing agent is usually a liquid with a boiling point not higher than the softening temperature of the thermoplastic polymer shell and may comprise one or more hydrocarbons each with 1 to 8 carbon atoms, preferably from 3 to 8 carbon atoms. Preferred hydrocarbons are selected from the group consisting of propane, n-pentane, isopentane, neopentane, butane, isobutane, hexane, isohexane, neohexane, heptane, isoheptane, octane or isooctane, or mixtures thereof. Aside from these, other types of hydrocarbons may also be used, such as petroleum ether, or chlorinated or fluorinated hydrocarbons, such as methyl chloride, methylene chloride, dichloroethane, dichloroethylene, trichloroethane, trichloroethylene, trichlorofluoromethane, perfluorinated hydrocarbons etc. Preferred blowing agents include isobutane, alone or in admixture with one or more of the abovementioned hydrocarbons. The boiling point at normal pressure is preferably within the range of from about −50° C. to about 100° C., most preferably from about −20° C. to about 50° C., especially from about −20° C. to about 30° C.

The particle size of the microspheres, represented as a volume median particle size D(0.5), is preferably from 1 μm or more to 500 μm or less, preferably from 5 μm or more to 100 μm or less, or from 5 μm or more to 40 μm or less. The particle size can be determined, for example, by laser light scattering.

The microspheres can be added to the polymer dispersion in different application forms, for example, in a dried form with a solids content of preferably more than 95% by weight, or in an incompletely-dried, moist form with a solids content of preferably 55% by weight or more to 85% by weight or less, or in the form of an aqueous slurry with a solids content of preferably from 5 to 55% by weight, or from 35 to 50% by weight.

The thermoplastic polymer shell of the microspheres can be formed from one or more homo- or copolymers obtainable by polymerizing ethylenically unsaturated monomers. Suitable monomers include, for example, acrylate esters, such as methyl acrylate or ethyl acrylate; methacrylate esters, such as methyl methacrylate, isobornyl methacrylate, or ethyl methacrylate; monomers containing nitrile groups, such as acrylonitrile, methacrylonitrile, alpha-chloroacrylonitrile, alpha-ethoxyacrylonitrile, fumaronitrile, or crotonitrile; vinyl halides, such as vinyl chloride; vinyl esters, such as vinyl acetate; vinylpyridine; vinylidene halides, such as vinylidene chloride; styrenes, such as styrene, halogenated styrenes or alpha-methylstyrene; dienes, such as butadiene, isoprene or chloroprene; vinyl ethers, especially those having only one C—C double bond. Examples of vinyl ethers include alkyl vinyl ethers, the alkyl group preferably having from 1 to 10 carbon atoms, most preferably from 1 to 5 carbon atoms, for example, methyl vinyl ether, ethyl vinyl ether, propyl vinyl ether, isopropyl vinyl ether, butyl vinyl ether, isobutyl vinyl ether, tert-butyl vinyl ether, sec-butyl vinyl ether, and mixtures thereof, among which methyl vinyl ether and ethyl vinyl ether are particularly preferred. One or more hydrogen atoms of the alkyl group may be substituted by at least one functional group, such as hydroxy, carboxylic acid, amine, ether etc., for example, ethylene glycol vinyl ether. Any mixtures of the abovementioned monomers may also be used.

Preferably, the monomers include at least one (meth)acrylate ester monomer, most preferably at least one methacrylate ester, such as methyl methacrylate. The amount thereof in the polymer shell is preferably from about 0.1% by weight or more to about 80% by weight or less, most preferably from about 1 to about 25% by weight of the total amount of monomers. Preferably, the monomers also include at least one vinylidene halide, most preferably vinylidene chloride. The amount thereof in the polymer shell is preferably from about 1 to about 90% by weight, most preferably from about 20 to about 80% by weight, of the total amount of monomers. Most preferably, the monomers include both at least one (meth)acrylate ester monomer and at least one vinylidene halide monomer. Preferably, the monomers include at least one nitrile-containing monomer, most preferably at least one selected from acrylonitrile and methacrylonitrile, especially acrylonitrile. The amount thereof in the polymer shell is preferably from about 1 to about 80% by weight, most preferably from about 20% by weight or more to about 70% or less of the total amount of the monomers.

In an advantageous embodiment, the monomers include at least one acrylate monomer, at least one vinylidene halide, and at least one nitrile-containing monomer. The polymer of the shell may be, for example, a copolymer obtainable from monomers including methyl methacrylate in a preferred amount from about 0.1% by weight or more to about 80% by weight or less, most preferably from about 1% by weight or more to about 25% by weight or less of the total amount of the monomers, vinylidene chloride in a preferred amount from about 1% by weight or more to about 90% by weight or less, most preferably from about 20% by weight or more to about 80% by weight or less of the total amount of the monomers, and acrylonitrile in a preferred amount from about 1% to about 80% by weight, most preferably from about 20% to about 70% by weight of the total amount of the monomers. Also suitable for the polymer shell are copolymers from monomers comprising 20 to 80% by weight of acrylonitrile and 1 to 70% by weight vinyl ether with only one C—C double bond, wherein the total amount of the acrylonitrile and of the vinyl ether is from 30 to 100% by weight, preferably from 50 to 100% by weight, or from 65 to 100% by weight of the ethylenically unsaturated monomers. The ethylenically unsaturated monomers preferably comprise from 1 to 60% by weight, from 1 to 50% by weight, from 5 to 50% by weight, or from 5 to 30% by weight, of vinyl ether with only one C—C double bond, and preferably from 40 to 80% by weight, most preferably from 50 to 70% by weight, acrylonitrile, and preferably further methacrylonitrile, preferably in an amount of from 1 to 50% by weight, most preferably from 5 to 40% by weight, and preferably further one or more esters of acrylic acid, esters of methacrylic acid, and mixtures thereof, preferably in an amount of from 1 to 50% by weight, preferably from 5 to 40% by weight.

Preferably, the shell of the microspheres is formed from a copolymer of ethylenically unsaturated monomers comprising at least one monomer selected from (meth)acrylate ester monomers, vinylidene halide monomers, acrylonitrile and vinyl ether monomers. Particularly preferred are copolymers of monomers comprising alkyl (meth)acrylate (e.g., methyl acrylate, ethyl acrylate, n-butyl acrylate, n-hexyl acrylate, octyl acrylate, and 2-ethylhexyl acrylate, and mixtures of such monomers), vinylidene chloride and acrylonitrile, or copolymers of monomers comprising at least one vinyl ether monomer, and acrylonitrile.

The monomers for the polymer shell may also include cross-linking multifunctional monomers, such as divinylbenzene, ethylene glycol di(meth)acrylate, diethylene glycol di(meth)acrylate, triethylene glycol di(meth)acrylate, propylene glycol di(meth)acrylate, 1,4-butanediol di(meth) acrylate, 1,6-hexanediol di(meth)-acrylate, glycerol di(meth)acrylate, 1,3-butanediol di(meth)acrylate, neopentyl glycol di(meth)acrylate, 1,10-decanediol (meth)acrylate, pentaerythritol tri-(meth)acrylate, pentaerythritol tetra(meth)acrylate, dipentaerythritol hexa-(meth)acrylate, triallylformal tri(meth)acrylate, allyl (meth)acrylate, trimethylolpropane tri(meth)acrylate, tributanediol di(meth)acrylate, PEG 200 di(meth)-acrylate, PEG 400 di(meth)acrylate, PEG 600 di(meth)acrylate, 3-acryloyloxy glycol monoacrylate, triacrylformal, triallyl isocyanate, triallyl isocyanurate, divinyl ether, ethylene glycol divinyl ether, diethylene glycol divinyl ether, triethylene glycol divinyl ether, tetraethylene glycol divinyl ether etc. Particularly preferred cross-linking monomers are at least trifunctional, for example, pentaerythritol tri(meth)acrylate, pentaerythritol tetra(meth)acrylate, dipentaerythritol hexa(meth)acrylate, triallylformal tri (meth)acrylate, trimethylolpropane tri(meth)acrylate, triacrylformal, triallyl isocyanate, and triallyl isocyanurate. The amount of cross-linking functional monomers may be, for example, from 0.1% by weight or more to 10% by weight or less, or from 0.1% by weight or more to 1% by weight or less, or from 0.2 to 0.5% by weight; and from 1 to 3% by weight of the ethylenically unsaturated monomers, wherein from 0.1 to 1% by weight is preferred, especially at least for trifunctional monomers, and from 1 to 3% by weight is preferred for difunctional monomers.

Apart from the polymer shell and the blowing agent, the microspheres may include further materials that were added, for example, during the preparation thereof, usually in an amount of 0% by weight or more to 20% by weight or less, preferably from 1% by weight or more to 10% by weight or less. Examples of such substances include solid suspension agents such as one or more substances selected from starch, cross-linked polymers, agar gum, derivatized cellulose such as methylcellulose, hydroxypropylmethylcellulose, carboxymethylcellulose and hydroxyethylcellulose, silicic acid, colloidal clays such as chalk and bentonite, and/or one or more salts, oxides or hydroxides of metals such as Al, Ca, Mg, Ba, Fe, Zn, Ni and Mn, for example, one or more substances selected from calcium phosphate, calcium carbonate, magnesium hydroxide, barium sulfate, calcium oxalate, and hydroxides of aluminum, iron, zinc, nickel or manganese. If present, these solid suspension agents are normally arranged mainly at the outer surface of the polymer shell.

Preferably, the microspheres are characterized in that the microspheres have a shell of thermoplastic polymer and a blowing agent enclosed therein, preferably isobutane, wherein preferably from 17 to 40% by weight blowing agent is enclosed in the microspheres, and said microspheres have a particle size (volume median D(0.5)) of 5 µm or more to 40 µm or less.

Polyols, Polyamines and Thermoplastic Polymer

The aqueous polymer dispersion further comprises at least one additional component selected from the group consisting of polyols, polyamines, and thermoplastic polymers.

The weight proportion of the additional component in the polymer dispersion is preferably from 1% by weight or more to 15% by weight or less, from 1% by weight or more to 8% by weight or less, or from 1% by weight or more to 5% by weight or less.

Suitable polyols include, for example, (poly)propylene glycol, (poly)ethylene glycol, glycerol and starch. Suitable polyamines include, for example, urea. The thermo-plastic polymers are selected from the group consisting of ethylene vinyl acetate, polyamide, polyester, polyethylene, polypropylene, polystyrene, styrene-containing copolymers, and ethylene/propylene copolymers. Ethylene/vinyl acetate (EVA) is preferred as an additional component. The ethylene/vinyl acetate may have a vinyl acetate content of up to 28% by weight, preferably at least 14% by weight.

The ethylene/vinyl acetate (EVA) may have a vinyl acetate content of up to 28% by weight. Particularly preferred are urea, EVA (e.g., in the form of EVA powder), starch and glycerol.

Surprisingly, it has been found that the use of such additional components significantly increases the setting speed during the bonding.

The use of these substances for formulating classical dispersion adhesives based on poly(vinyl acetate) (PVAc), vinyl acetate/ethylene (VAE; also referred to as "ethylene/ vinyl acetate" or "EVA") or acrylate is not novel, but water-retardation and thus reduced drying and setting speed is mostly observed in these systems.

However, in the system according to the invention, the effect is precisely the opposite. On all substrate combinations tested, there is a clear increase of setting speed. This is due to an improvement of water discharge from the dispersion strand.

Surprisingly, it has also been found that the presence in the dispersion or the formulation of a proportion of tackifiers typically used in such systems may reduce the setting speed of the base dispersion. This, however, may be counterbalanced by the addition of polyols, polyamines or EVA.

Surprisingly, it has also been found that the addition of starch to the dispersion improves the strand quality during the discharge in an ideal way, but leads to a reduction of the setting speed. This is astonishing, since the process temperatures are above the gelatinization temperature of commercially available starches. Again, the setting speed can be improved by auxiliary agents, such as urea or the like.

Surprisingly, it has further been found that the introduction of powdered EVA (ethylene/vinyl acetate copolymer) into the dispersion also significantly increases the setting speed as compared to the baseline value.

In a preferred embodiment of the invention, the dispersed polymer (i) is selected from the group consisting of polyacrylate, poly(styrene-acrylate) and polyurethane, and the additional component (iii) is ethylene-vinyl acetate. Further, it is preferred that the aqueous dispersion comprises polyacrylate as a dispersed polymer (i) and ethylene-vinyl acetate as an additional component (iii). The above statements relating to the individual components and their proportions are also applicable to these preferred embodiments.

Additional Additives

The aqueous polymer dispersion may exclusively consist of (i) the polymer dispersed in an aqueous phase, (ii) the microspheres and (iii) polyols, polyamines or the thermoplastic polymer, preferably ethylene-vinyl acrylate, but may also contain further additives other than said additional components.

As additives in pressure-sensitive adhesives, so-called tackifying resins (tackifiers), for example, may be considered. Tackifiers include, for example, natural resins, such as rosin resins, and derivatives thereof formed by disproportionation or isomerization, polymerization, dimerization, hydrogenation. The acid groups of such resins may be in their salt form (for example, with mono- or polyvalent counter ions), or preferably in their esterified form. Alcohols used for esterification may be mono- or polyvalent. Examples include methanol, ethanediol ("glycol"), diethylene glycol, triethylene glycol, 1,2,3-propanetriol, pentaerythritol.

Preferred tackifiers are natural or chemically modified rosin resins. Rosin resins predominantly consist of abietic acid or abietic acid derivatives.

Further additives for increasing the tackiness (tackifiers) are low molecular weight polymers, such as acid-containing polyacrylates with glass temperatures within the range of from −60° C. to −20° C. The low molecular weight polymers that can be used as tackifiers have a weight average molecular weight of preferably 500000 or less, preferably from 1500 or more to 45000 or less, or from 2000 or more to 20000 or less, and may be added to the polymer dispersion, for example, in the form of a 100% system. The tackifiers are preferably contained in the aqueous polymer dispersion in amounts of 1% by weight or more to 40% by weight or less, especially from 5% or more to 30% by weight.

Further additives that may be contained in the aqueous dispersion include, for example, antioxidants, fillers, colorants, flow control agents, and plasticizers and wetting agents.

Suitable wetting agents include, for example, sulfosuccinates, especially sulfosuccinic acid alkyl esters (methyl, ethyl, propyl, butyl, pentyl, hexyl and isooctyl esters). They are employed for lowering the surface tension of the dispersion and lead to a better wetting of the substrates that are to be bonded.

Polymer Dispersion

Preferred polymer dispersions are characterized in that the content of dispersed polymer in the polymer dispersion is from 20% by weight or more to 75% by weight or less, preferably from 40% by weight or more to 70% by weight or less, the content of microspheres in the polymer dispersion is from 0.1% by weight or more to 20% by weight or less, preferably from 0.5% by weight or more to 10% by weight or less, and the total solids content of the aqueous polymer dispersion is from 30% by weight or more to 80% by weight or less, preferably from 40.5% by weight or more to 80% by weight or less, or from 45% by weight or more to 75% by weight or less. This corresponds to a water-content of from 20% by weight or more to 70% by weight or less, or from 20% by weight or more to 59.5% by weight or less, or from 25% by weight or more to 55% by weight or less.

The viscosity of the coating composition before the coagulation is, in particular, at least 20 mPa·s or more, or from 50 mPa·s or more to 3000 mPa·s or less, more preferably from 100 mPa·s or more to 2000 mPa·s or less. Viscosities are measured according to DIN EN ISO 3219 (23° C., 250 s$^{-1}$).

Coagulation

In the above-described aqueous polymer dispersions, an energy input takes place to induce coagulation. Preferably, the energy input for coagulation is effected thermally and/or mechanically and/or by ultrasound.

Particularly preferred is a combination of thermal and mechanical energy inputs, i.e., simultaneous heating and shearing. The heating is preferably effected at a temperature of from 50° C. or more to 150° C. or less, preferably from 60° C. or more to 110° C. or less. The temperature is greater than or equal to $T_{start}$ of the microspheres. The heating may be effected by flowing through a heatable discharge opening, especially through a heatable nozzle, or by introducing heated gases, especially heated air, or steam.

For shearing, the shear-rates are preferably within the range of from 100 s$^{-1}$ or more to 500000 s$^{-1}$ or less. The shearing may be effected by forcing the dispersion through a micro-channel with diameters of preferably 0.5 to 10 mm.

Therefore, the invention also relates to a coagulate obtainable by thermal and/or mechanical and/or ultrasound-initiated coagulation of the aqueous polymer dispersion according to the invention.

The coagulate is preferably obtainable by thermally-initiated coagulation of the aqueous polymer dispersion according to the invention by heating it at a temperature of 50° C. or more to 150° C. or less, preferably 60° C. or more to 110° C. or less, and/or mechanical coagulation by shearing the aqueous polymer dispersion according to the invention at shear rates of from 100 s$^{-1}$ or more to 500000 s$^{-1}$ or less.

Adhesive Bonding of Substrates

The present invention also relates to an adhesive comprising or exclusively consisting of the abovementioned coagulate, and to a substrate that is entirely or partially coated with the coagulate or the adhesive.

The coated substrate is preferably selected from the group consisting of paper, paperboard, cardboard, wood, stone, concrete, non-woven fabrics of artificial and/or natural fibers, woven textiles of artificial and/or natural fibers, open-pore or closed-pore polymer foams, especially consisting of polyurethane, polyester, polyethylene, polypropylene and polystyrene, or composites of the abovementioned substrates, for example, with plastic materials. Natural materials and composites thereof with plastic materials are also suitable substrates.

The polymer dispersion is applied to at least one substrate preferably in a coagulated form. Thus, at least one substrate is coated with a coagulated polymer dispersion according to the invention. Preferably, the polymer dispersion is an adhesive dispersion, which is applied to at least one substrate preferably in the form of a strand. Preferably, the application of the coagulated coating composition is effected with a nozzle. The coating is preferably performed in a continuous process in the case of a sheet-like coating, and as a discontinuous process in the case of, for example, the sealing of a cardboard carton. The substrates or support materials may preferably be paper, paperboard or cardboard. The coated substrate is then bonded to the other substrate to be bonded, which is also coated with the adhesive, or uncoated.

In a preferred process, the polymer dispersion is an adhesive dispersion, which is applied in coagulated form to a sealable region of a cardboard packaging, followed by sealing the cardboard packaging by means of the applied coagulated adhesive dispersion.

Preferably, the aqueous dispersion is conveyed into the application device. Then it is transformed therein into a coagulate (solidification) by means of the trigger, such as the temperature, shear or pressure, which exits as a solid strand from the discharge opening, for example, a capillary or nozzle. This solid strand contains the water of the dispersion finely distributed in its interior. When the substrates are joined, the water exits through the strand pores and is released to the substrate/environment.

The invention also relates to coated substrates obtainable by the above-described process for coating substrates with a coagulated polymer dispersion.

Surprisingly, it has further been found that the coagulated dispersion according to the invention is suitable not only for bonding papers and cardboards, but also for bonding sheet-laminated or coated surfaces in an ideal way (e.g., HDPE coating, OPP, PET, PS). Preferably, at least one highly-absorbing counter-surface is present, as the coagulated dispersion strand still contains water enclosed therein, which promotes the adhesive bonding.

The coagulated polymer dispersions according to the invention can further be used in the field of bookbinding, especially in gluing together the body of books. Another field of application of the coagulated polymer dispersions according to the invention is in the pleating and frame-bonding of filter media. The coagulated polymer dispersions according to the invention may also be applied as binders in 3D-printing methods.

As compared to hotmelt adhesives, the coagulated dispersion according to the invention has the advantage of having a higher heat-resistance (e.g., about 200° C. as compared to about 70° C.) and a very good cold-resistance (material fracture at about −20° C., about −40° C.). The use of tackifiers in the bonding of kraftliner has no influence on the heat-resistance.

The aqueous polymer dispersion according to the invention and the process according to the invention provide the following particular advantages:

The coagulation of the polymer dispersion results in a quick build-up of the adhesive forces, which is within the same range as that of hotmelt systems. This is not possible using conventional application systems of aqueous (pressure-sensitive) adhesive dispersions. As such, pressure-sensitive adhesive dispersions have not been usable in the sealing of cardboard cartons to date.

Thus, the aqueous polymer dispersion according to the invention can be used for the preparation of coagulates, especially by thermal, mechanical or ultrasound-initiated coagulation. The coagulate according to the invention can be used as an adhesive, i.e., for the (adhesive) bonding of substrates (materials, parts to be joined), especially for the adhesive bonding of paper, cardboard and bodies of books, and in the preparation of filter-media. By way of example, suitable filter-media may be those made of polyester non-woven fabrics, polypropylene non-woven fabrics and combinations of polyester non-woven fabrics with active charcoal or polypropylene non-woven fabrics with active charcoal.

The coagulate according to the invention may further be used as a binder in 3D-printing methods. In 3D-printing, three-dimensional workpieces are built layer-by-layer. The building is effected under computer control from one or more liquid or solid materials according to predefined dimensions and shapes (CAD). During the build, physical or chemical curing or melting processes take place. Typical materials for 3D-printing include plastic materials, synthetic resins, ceramics and metals. 3D-printing is a generative or additive manufacturing process. In this regard, reference is made to the known prior art.

The invention is described in more detail by the following Examples, but without being limited thereto.

EXAMPLES

The coagulatable aqueous dispersion according to the invention (e.g., self-crosslinking styrene-acrylate dispersion Acronal 5044, modified with 2 to 8% by weight additional component and, optionally, tackifier) was conveyed from a storage vessel by means of a peristaltic pump, passed through a heatable capillary (interior diameter about 1 mm, length about 240 mm, heatable length about 150 mm), and applied to a paper or cardboard surface at the capillary exit (predominantly white kraftliner, type BE 73W, 135 g/m$^2$). The thus obtained substrate was covered with a counter substrate in a specific device immediately after the application, and the composite was compressed for varying periods of time (toggle-press). After completion of the pressing process, a destruction test of the adhesive bond was directly performed by suddenly pulling the substrates apart. The core criterion for a stable adhesive bond is a fiber tear in the kraftliner material.

TABLE 1

Setting speeds [sec] as a function of the addition of additives. Test substrate: kraftliner.

| Dispersion | Modification | AZG Kraftliner white/white | AZG Kraftliner white/brown | AZG Kraftliner brown/brown |
|---|---|---|---|---|
| Acrylate dispersion with tackifier | none | 50 | 30 | 30 |
| Acrylate dispersion with tackifier | urea | 5-10 | 10 | 20 |
| Acrylate dispersion with tackifier | EVA powder | 20 | 20 | 25 |
| Acrylate dispersion without tackifier | none | 30 | 30 | 20 |
| Acrylate dispersion without tackifier | urea | 5-10 | 15 | 15 |
| Acrylate dispersion without tackifier | glycerol | 5-10 | 5-10 | 20-30 |

TABLE 2

Setting speed [sec] in sheet-laminated test substrates: kraftliner and sheet-laminated kraftliner (PET, PS, HDPE coating).

| Dispersion | Modification | Kraftliner white/PET sheet | Kraftliner white/PS sheet | Kraftliner white/HDPE coating |
|---|---|---|---|---|
| Acrylate dispersion without tackifier | urea | 5 sec | 5 sec | 20 |

Determination of Heat Resistance in Kraftliner Composites:

The coagulated dispersion is applied to a kraftliner with dimensions of 5 cm×4 cm by means of a capillary and immediately covered by another kraftliner with the same dimensions. The bonded area is compressed for 30 seconds and conditioned at room temperature overnight. The test specimen is attached within a drier and loaded with a weight (m=200 g) on one side of the substrate. Subsequently, the temperature is gradually increased (10° C./10 min).

| Dispersion | Modification | AZG Kraftliner white/white | AZG Kraftliner white/brown | AZG Kraftliner brown/brown |
|---|---|---|---|---|
| Acrylate dispersion with tackifier | urea | termination at 200° C. | termination at 200° C. | termination at 200° C. |
| Acrylate dispersion without tackifier | urea | termination at 200° C. | termination at 200° C. | termination at 200° C. |

The invention claimed is:

1. A coagulate comprising a simultaneously thermally and mechanically-coagulated and/or thermally and ultrasound-coagulated composition comprising an aqueous polymer dispersion, wherein the aqueous polymer dispersion comprises:
   (i) at least one polymer dispersed in an aqueous phase and selected from the group consisting of polyurethane, vinyl acetate/ethylene copolymers, poly(vinyl acetate) (PVAc), polyacrylate, poly(styrene/acrylate), styrene/butadiene (block) copolymer, styrene/isoprene (block) copolymer, polyisoprene copolymer, polychloroprene, polyolefin homopolymers and copolymers of $C_2$-$C_8$ alkenes, polyepoxide and polylactic acid,
   (ii) thermoplastic microspheres containing a blowing agent, and
   (iii) at least one additional component selected from the group consisting of polyols, polyamines and thermoplastic polymers selected from the group consisting of polyamide, polyester and polystyrene.

2. The coagulate according to claim 1, wherein said polyol is selected from the group consisting of (poly)propylene glycol, (poly)ethylene glycol, glycerol, and starch, wherein said polyamine is urea, and wherein said thermoplastic polymers are selected from the group consisting of polyamide, polyester and polystyrene.

3. The coagulate according to claim 1, wherein the content of dispersed polymer in the polymer dispersion is 20% by weight or more to 75% by weight or less, the content of said microspheres in the polymer dispersion is 0.1% by weight or more to 20% by weight or less, and the total solids content of said aqueous polymer dispersion is 30% by weight or more to 80% by weight or less.

4. The coagulate according to claim 1, wherein the content of additional component in the polymer dispersion is from 1% by weight or more to 15% by weight or less, from 1% by weight or more to 8% by weight or less, or from 2% by weight or more to 5% by weight or less.

5. The coagulate according to claim 1, wherein said microspheres have a shell of thermoplastic polymer and a blowing agent enclosed therein, said blowing agent comprising one or more hydrocarbons having one carbon or more to eight carbons or less in the chain, wherein said microspheres have a volume median particle size D(0.5) of 5 μm or more to 40 μm or less in a non-expanded state.

6. The coagulate according to claim 1, wherein said shell of said microspheres is formed from a copolymer of ethylenically unsaturated monomers comprising at least one monomer selected from (meth)acrylate ester monomers, vinylidene halide monomers, acrylonitrile and vinyl ether monomers.

7. The coagulate according to claim 1, wherein said microspheres have an expansion starting temperature ($T_{start}$) of 40° C. or more to 140° C. or less, and a temperature of maximum expansion ($T_{max}$) that is higher than $T_{start}$ and is within the range of from 80° C. or more to 200° C. or less.

8. The coagulate according to claim 1, wherein said coagulation is effected thermally by heating at a temperature of 50° C. or more to 150° C. or less and that the coagulation is effected by shearing at shear rates of 100 s$^{-1}$ or more to 500000 s$^{-1}$ or less.

9. A process for preparing a coagulate, comprising simultaneously conducting a thermal and mechanical initiated and/or thermally and ultrasound-initiated coagulation of an aqueous polymer dispersion, comprising:
   (i) at least one polymer dispersed in an aqueous phase and selected from the group consisting of polyurethane, vinyl acetate/ethylene copolymers, poly(vinyl acetate) (PVAc), polyacrylate, poly(styrene/acrylate), styrene/butadiene (block) copolymer, styrene/isoprene (block) copolymer, polyisoprene copolymer, polychloroprene, polyolefin homopolymers and copolymers of $C_2$-$C_8$ alkenes, polyepoxide and polylactic acid,
   (ii) thermoplastic microspheres containing a blowing agent, and
   (iii) at least one additional component selected from the group consisting of polyols, polyamines and thermoplastic polymers selected from the group consisting of polyamide, polyester and polystyrene,
   wherein, the aqueous polymer dispersion is coagulated by heating the dispersion at a temperature of 50° C. to 150° C. and by exposing the dispersion to a shear rate of from 100 s$^{-1}$ to 500000 s$^{-1}$.

10. An adhesive or binder comprising or consisting of the coagulate according to claim 1.

11. A substrate entirely or partially coated with the coagulate according to claim 1.

12. The coated substrate according to claim 11, wherein said substrate is selected from the group consisting of paper, paperboard, cardboard, wood, stone, concrete, non-woven fabric of artificial and/or natural fibers, woven textiles of artificial and/or natural fibers, open-pore or closed-pore polymer foams, in particular from the group consisting of polyurethane, polyester, polyethylene, polypropylene and polystyrene, or composites of the above mentioned substrates.

13. A 3D-printed article or object comprising the binder according to claim 10.

14. The coagulate according to claim 1, wherein the aqueous polymer dispersion comprises:
   (i) a poly(styrene/acrylate) polymer dispersed in an aqueous phase,
   (ii) thermoplastic microspheres containing a blowing agent, and
   (iii) ethylene-vinyl acetate, urea, starch, or glycerol.

* * * * *